US008594918B2

(12) United States Patent
Meyer-Ebeling et al.

(10) Patent No.: US 8,594,918 B2
(45) Date of Patent: Nov. 26, 2013

(54) METHOD FOR ESTIMATING THE RANGE OF A MOTOR VEHICLE

(75) Inventors: Joerg Meyer-Ebeling, Stuttgart (DE); Martin Roth, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 352 days.

(21) Appl. No.: 12/915,137

(22) Filed: Oct. 29, 2010

(65) Prior Publication Data

US 2011/0112710 A1 May 12, 2011

(30) Foreign Application Priority Data

Nov. 11, 2009 (DE) .......................... 10 2009 052 853

(51) Int. Cl.
*G06F 19/00* (2011.01)
(52) U.S. Cl.
USPC .............................. 701/123; 701/22; 701/533
(58) Field of Classification Search
USPC .............................. 701/22, 123, 414, 532, 533
See application file for complete search history.

(56) References Cited

U.S. PATENT DOCUMENTS

| | | | | |
|---|---|---|---|---|
| 5,487,002 A | * | 1/1996 | Diller et al. ........................ | 701/1 |
| 5,627,752 A | * | 5/1997 | Buck et al. ...................... | 701/36 |
| 6,078,853 A | | 6/2000 | Ebner et al. | |
| 2004/0049339 A1 | * | 3/2004 | Kober et al. ................... | 701/209 |
| 2005/0251332 A1 | * | 11/2005 | Entenmann et al. .......... | 701/208 |
| 2009/0088960 A1 | * | 4/2009 | Moll .............................. | 701/123 |
| 2010/0049397 A1 | * | 2/2010 | Liu et al. ......................... | 701/33 |
| 2010/0114473 A1 | * | 5/2010 | Kono et al. .................... | 701/200 |
| 2010/0174451 A1 | * | 7/2010 | Leinung .......................... | 701/36 |
| 2010/0198508 A1 | * | 8/2010 | Tang ............................. | 701/210 |

FOREIGN PATENT DOCUMENTS

| | | |
|---|---|---|
| DE | 43 44 369 | 7/1995 |
| DE | 101 38 750 | 2/2003 |
| DE | 103 02 504 | 9/2004 |
| DE | 10 2007 042 351 | 3/2009 |
| DE | 10 2008 037 262 | 5/2009 |
| EP | 2028059 | 2/2009 |
| FR | 2918326 | 1/2009 |
| JP | 10260050 | 9/1998 |
| JP | 2007-253904 | 10/2007 |

* cited by examiner

*Primary Examiner* — Helal A Algahaim
(74) *Attorney, Agent, or Firm* — Gerald E. Hespos; Michael J. Porco; Matthew T. Hespos

(57) ABSTRACT

A method is provided for estimating the range of a motor vehicle based on a quantity of energy carried in the motor vehicle. The method enables a driver to limit a maximum permissible velocity and/or a maximum permissible acceleration and/or a maximum performance level for a comfort system. The method also detects the route profiles surrounding the motor vehicle, in particular an altitude profile and/or a road category. A computer device calculates and displays a still possible range at least on the basis of the limitation which has been carried out, the detected route profiles and the still available quantity of energy.

23 Claims, 2 Drawing Sheets

METHOD FOR ESTIMATING THE RANGE OF A MOTOR VEHICLE

CROSS-REFERENCE TO RELATED APPLICATION

This application claims priority under 35 USC 119 to German Patent Application No. 10 2009 052 853.9 filed on Nov. 11, 2009, the entire disclosure of which is incorporated herein by reference.

BACKGROUND OF THE INVENTION

1. Field of the Invention

The invention relates to a method for estimating the range of a motor vehicle by means of a quantity of energy that is carried along in the motor vehicle and can be detected. The invention also relates to a motor vehicle having a device for estimating range.

2. Description of the Related Art

DE 43 44 369 A1 discloses a method for consumption-oriented limitation of the driving performance, in particular for electric vehicles. The method assists the driver in utilizing the energy supply that is carried along. A permissible route consumption, which is related to the residual distance, is calculated continually on the basis of the existing energy supply. A preset value then is determined from the permissible route consumption taking into account running resistances and actuates a device for limiting the driving performance.

U.S. Pat. No. 5,487,002 also discloses a method for estimating range in electric vehicles as a function of a wide variety of parameters such as running resistances, running profiles or the state of charge of a vehicle battery.

In contrast to conventional gasoline stations, there is still only been a sparse network of recharging points available for electric vehicles. Therefore, becoming inadvertently stuck on the open road is extremely inconvenient for electric vehicles. Merely managing to reach a recharging point is not desirable for electric vehicles because a recharging process takes a considerable time and delays the ongoing journey. For these reasons, it may be beneficial under certain circumstances to apportion the energy supply by selectively throttling driving style so that the energy supply that is still available in the motor vehicle is sufficient at least to reach the selected destination. Moreover, a driver of an electric vehicle desirably should be able to estimate the maximum range that is available if no specific destination has been set.

The invention is concerned with a method for improved energy management.

SUMMARY OF THE INVENTION

The invention relates to a method for estimating the range of a motor vehicle by presetting or limiting parameters that may affect the range. The parameters that may be preset or limited as part of the method relate generally to driving performance and may include or more of a maximum permissible velocity, a maximum permissible acceleration and a maximum performance level for a comfort system (such as the cooling power of an air-conditioning system). The method proceeds by calculating and displaying a still possible range together with these presettings, a still available quantity of energy and a detected route profile. In this context, the motor vehicle carries a detectable quantity of energy, for example a specific number of liters of a fossil fuel or a specific quantity of electrical energy stored in a vehicle battery. The driving performance is limited initially before the driver starts the journey in the form of a maximum permissible velocity and/or a maximum permissible acceleration. Moreover, the motor vehicle is able to use, for example, a navigation device, to detect the route profiles surrounding the motor vehicle, for example an altitude profile, a category of road (freeway, country road or federal highway), weather, state of the road, traffic and the like. The computer device in the motor vehicle is capable here of calculating the still possible range of the motor vehicle at least on the basis of the limitations that are carried out, the detected route profiles and the still available quantity of energy. The computer device in the motor vehicle can utilize the navigation system to display these data.

The method of the invention for estimating range is particularly advantageous for electric vehicles because the network of recharging points is significantly sparser than a network of normal refueling stations, and because a charging process takes significantly longer for an electric vehicle than the usual refueling of a conventional motor vehicle. The method of the invention enables the driver to estimate with ease whether he can still reliably reach a previously selected destination. Furthermore, the method of the invention enables the driver of the motor vehicle to receive a type of range radius about the current position, when a destination has not been specified in advance. The range radius can be displayed visually to the driver on the navigation device. The range radius, of course, also is calculated as a function of the route profile, the quantity of energy still available in the motor vehicle, and the previously defined maximum permissible driving performance. Therefore, the range radius provides a particularly precise way of estimating the still remaining range. The range radius is provided as a function of possible routes in all the points of the compass or with respect to a predefined destination.

The computer device takes into account at least one of the following parameters in the calculation of the still possible range: vehicle properties, state of vehicle, weather, vehicle weight, comfort style and state of energy accumulator. In particular, for the vehicle properties the computer device also can consider subparameters such as: an efficiency level, frictional losses at the tires, aerodynamic resistances etc. As a result, a finely branched network is provided that permits particularly precise and exact estimation of the still possible range. Of course, further subparameters such as, for example, settings on an air-conditioning system, age of a vehicle battery etc. can be taken into account and included in the calculation of the still possible range.

The fact that the driving performance limits defined by the driver have been reached may be indicated haptically, for example by an accelerator pedal characteristic curve, visually and/or acoustically. In this context, an accelerator pedal characteristic curve can, for example, be adapted so that the driving performances that are set, i.e. the preset, maximum permissible acceleration or velocity are displayed with the position of a stop that is also variable. The position of the stop can be bypassed selectively to request relatively high driving performances, for example to enable an overtaking maneuver. Such a stop, which is however constant, is known in a similar way from conventional operator control concepts as a kickdown. The range forecast preferably is recalculated continuously during the journey and is adapted, for example, to changed limitations with respect to the maximum permissible acceleration or with respect to the maximum permissible velocity.

Further important features and advantages of the invention emerge from the drawings and from the associated description of the figures. The features mentioned above and the

DETAILED DESCRIPTION OF THE PREFERRED EMBODIMENTS

Figure 1:
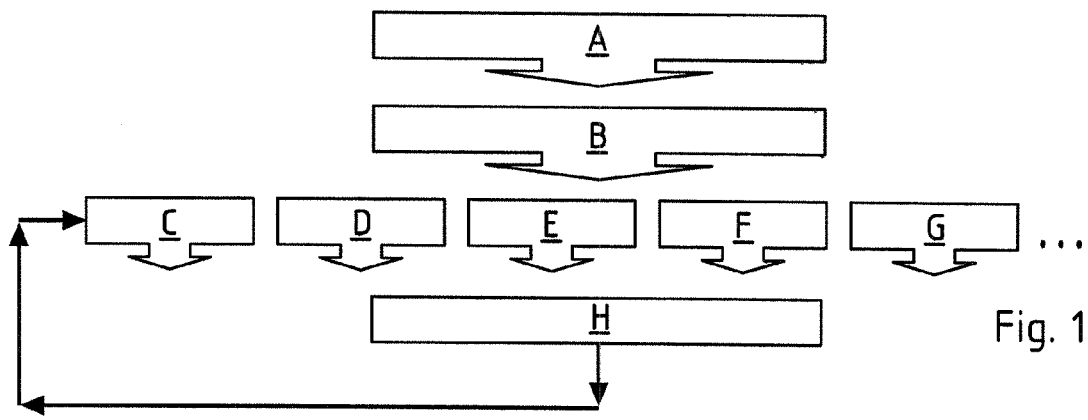
FIG. 1 shows a sequence of a method steps according to the invention for estimating range in a motor vehicle.

FIG. 1 illustrates a method according to the invention for estimating the range of a motor vehicle, in particular an electric vehicle or a hybrid vehicle. The method has a plurality of steps A to H that run in serial or parallel fashion. Method step A includes detecting a quantity of energy carried in the motor vehicle, for example the content of a fuel tank or the charge state of a vehicle battery. Method step B is initiated by the driver and includes limiting the driving performance. Method step B may include, for example limiting a maximum permissible velocity and/or a maximum permissible acceleration.

Figure 3:
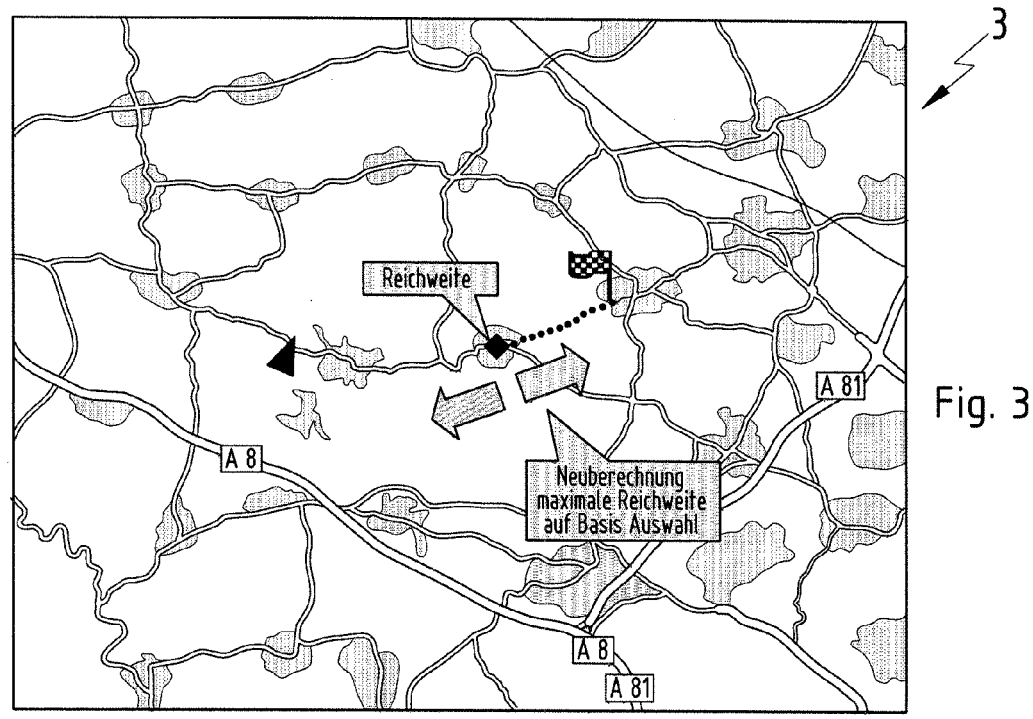
FIG. 3 is an illustration of a navigation device in the case of a predefined destination and an insufficient range of the motor vehicle.
Figure 4:
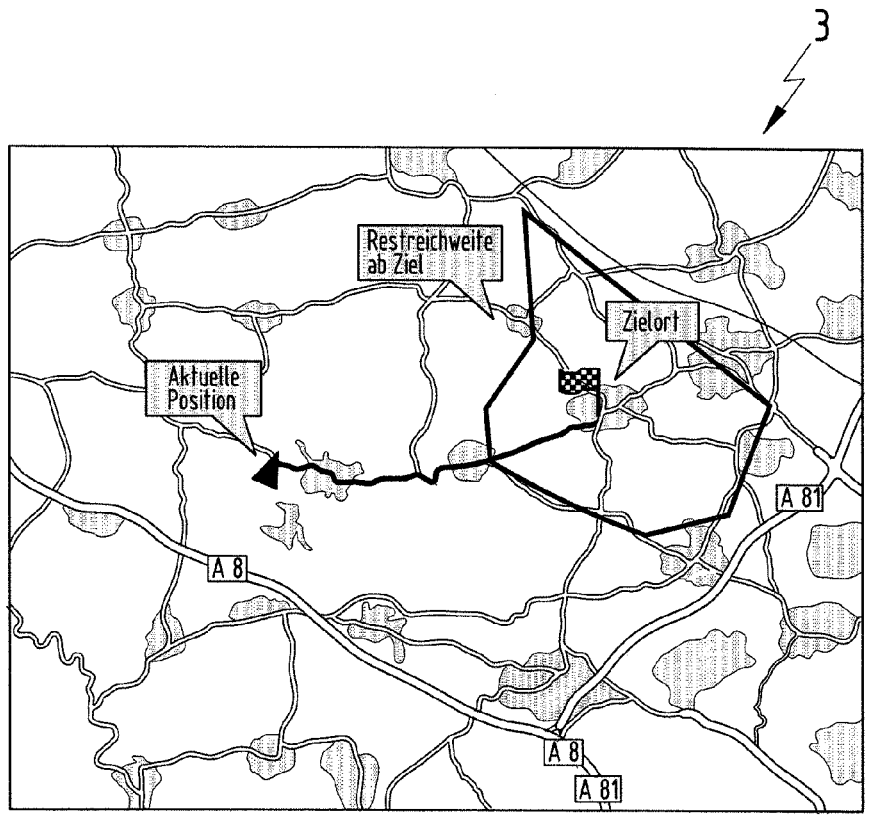
FIG. 4 is an illustration as in FIG. 3, but with an available range that goes beyond the destination.
Figure 5:
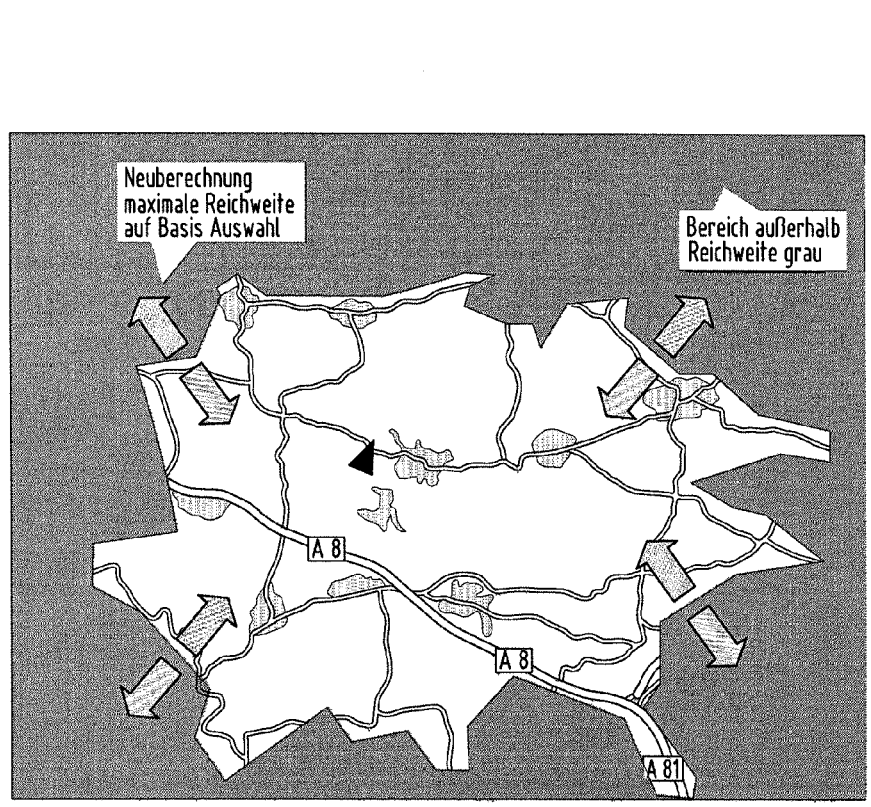
FIG. 5 shows a range on a map without an associated preset destination.

Method step C may be carried out by a navigation device and includes detecting the route profiles surrounding the motor vehicle, such as an altitude profile or a road category. More particularly, estimating the range of the motor vehicle requires knowledge of whether the motor vehicle will be moving on freeways, country roads, federal highways or even minor roads, and whether differences in altitude have to be overcome. Parallel with the method step C, the driver can select a limitation of the driving performance by defining a desired driving style, for example "gentle", "normal" or "sporty". Alternatively, the driving style can be defined by recorded data from previous journeys by the driver. In particular, the driving style can be tailored to the use of regeneration by the driver. The maximum permissible torque at the engine also may be limited by the driver. All of this can take place in method step D. Method step H uses a computer device for calculating a still possible range of the motor vehicle at least on the basis of the limitations that are carried out, the detected route profiles and the still available quantity of energy. The computer device displays this information on a screen of a navigation device as illustrated in FIGS. 3-5. The method of the invention therefore enables the driver to influence individually the maximum possible range by means of specific performance presettings.

The computer device can take into account further parameters in the calculation of the still possible range in the method steps E, F, G . . . , such as, for example, the vehicle properties, a state of the vehicle, the weather, a comfort style and/or a state of the energy accumulator. The vehicle properties that are taken into account include: efficiency of an axle system, losses of a drive, losses of an axle system and/or of the tires, friction and rolling resistances, aerodynamic characteristic values and an energy demand by comfort systems, assistance systems and/or safety systems. Possible comfort systems include energy-intensive devices such as an air-conditioning system or an electric heating system. The state of the vehicle can take into account the state of maintenance of the vehicle, a wear level, possible damage, a temperature of the engine or transmission, a payload, an age of the vehicle and extensions such as, for example, a roof box, a cycle stand or the like. The weather conditions may account for external temperatures, precipitation, wind and a state of the road. The state of the energy accumulator may account for an age, a charge state or a temperature of a vehicle battery because these factors significantly influence the maximum possible range of an electrical vehicle. The above-mentioned listing is not complete and further parameters that are not mentioned may be included in the calculation of the still possible maximum range. In this context, the more information that is available about the route, for example traffic states, altitude data, speed limits etc., the more precise a forecast may turn out to be.

Figure 2:
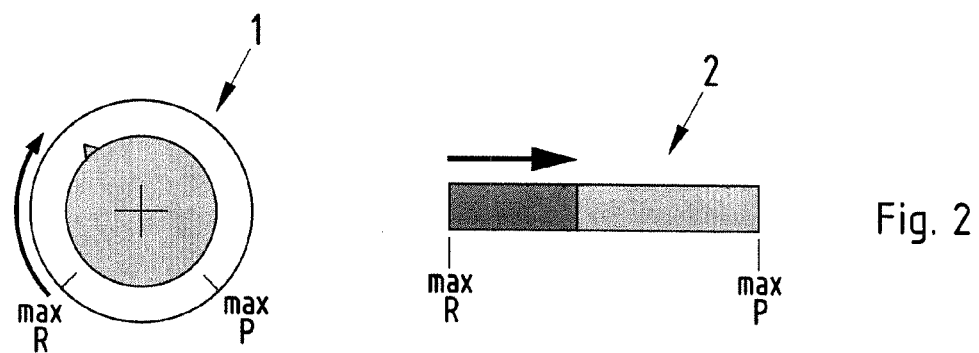
FIG. 2 shows possible embodiments of operator control elements for setting a ratio between a maximum range and a maximum performance level.

FIG. 2 shows an operator control element 1 in the form of a rotary switch or an operator control element 2 in the form of a slide by means of which a weight ratio between the maximum possible range max R and max possible performance level max P can be set. The operator control elements 1, 2 can be embodied here either in a mechanical way or merely as a touch screen. Of course, the maximum permissible speed or the maximum permissible acceleration can be set by the operator control elements 1, 2.

The method of the invention influences the range by limiting driving performances, such as the maximum permissible velocity and/or the maximum permissible acceleration that are set in advance by the driver. Thus, a desired range is set indirectly by setting the driver performances, and the forecasted ranges that result from the selection of the performances can be displayed on a navigation device 3 (cf. FIGS. 3-5). The method enables the driver to increase the range of the motor vehicle by limiting the driving performance to reach the selected destination, to maintain a range reserve or simply just to save energy.

The operator control elements 1, 2 illustrated in FIG. 2 permit the weighting to be performed between maximum possible range max R and maximum possible performance level max P. The maximum possible range max R reduces the driving performance, the maximum permissible velocity or the maximum permissible acceleration. The weighting index set by the operator control element 1, 2 can be recalculated with suitable characteristic curves to perform a maximum permissible speed or a maximum acceleration. Alternatively, the maximum permissible velocity or the maximum permissible acceleration can be set directly in km/h or in m/s$^2$ or else also as percentage of the maximum acceleration, and input.

The fact that the driving performance limits specified by the driver are reached can be indicated haptically, for example by an accelerator pedal characteristic curve or a pressure point, and/or visually and/or acoustically. In this context, the operator control concept can be analogized to the kick-down that is used in automatic transmissions. The accelerator pedal characteristic curve preferably is adapted so that the driving performance levels that are set are displayed with the position of the stop. Relatively high driving performance levels can be requested by bypassing this stop, or the maximum driving performance levels can be requested for an overtaking maneuver. An accelerator pedal with a variable pressure point (stop) can be an interesting alternative to changing the accelerator pedal characteristic curve. The range forecast preferably is updated continuously during the journey, and the predefined driving performance levels also can be changed during the journey.

FIG. 3 is an illustration of the navigation device 3 and shows the motor vehicle located at the position with the triangular symbol. A destination flag marks the destination set with the navigation device 3. Execution of the method estimates the range and determines whether the quantity of energy still on board is sufficient to reach the destination.

In contrast, FIG. 4 illustrates a motor vehicle with a quantity of energy that is so large that it reaches the destination without difficulty and still has a residual range beyond this destination. According to FIG. 5, the destination has not been input in advance at all. In this case the method merely calculates a maximum possible action radius that is, of course, dependent on the preset driving performance levels, the respective road profile and the quantity of energy still on board. The jagged edge of the still possible action radius results here, for example, from different altitude profiles of the individual roads.

The method illustrated in FIG. 1 also can be refined incrementally by determining further, non-specified parameters, for example by means of vehicle-internal and external sensors (car-2-x, TMC, Galileo, GSM) and included in the calculation of the maximum possible range. It is also conceivable to record and evaluate previous journeys and acquire further calculation parameters therefrom.

To reduce the energy demand further during driving, it is also possible to provide for the driver to be supplied with displays and/or other driving instructions. The navigation device 3 preferably can display the range in color or symbolically on the route, of indicating set speeds compared to permitted maximum speeds, of carrying out a time calculation of the route together with the necessary charging times and of correspondingly displaying it, of also displaying an energetic optimum route as an alternative to a fastest route and a shortest route, and of providing a logic link to, for example, leisure time possibilities at planned charging stops.

What is claimed is:

1. A method for estimating a range of a motor vehicle, comprising:
    detecting a quantity of energy carried in the motor vehicle;
    identifying route profiles for each of a plurality of routes surrounding the motor vehicle;
    selecting a maximum permissible amount for at least one driver-controllable vehicle performance characteristic that affects an energy consumption rate;
    calculating a still possible range for each of the plurality of routes at least on the basis of the detected quantity of energy carried in the motor vehicle, the identified route profiles surrounding the motor vehicle and the selected maximum permissible amount for at least one driver-controllable vehicle performance characteristic;
    displaying in the motor vehicle the calculated still possible range on each of the plurality of routes.

2. The method of claim 1, wherein the step of identifying route profiles surrounding the motor vehicle comprises identifying at least one of an altitude profile and road categories.

3. The method of claim 1, wherein the step of selecting a maximum permissible amount for at least one driver-controllable vehicle performance characteristic that affects an energy consumption rate comprises selecting at least one of a maximum velocity, a maximum acceleration, a maximum permissible torque and a maximum performance level for a comfort system.

4. The method of claim 3, wherein the step of calculating a still possible range and the step of displaying the calculated still possible range are carried out using a computer device in the motor vehicle.

5. The method of claim 1, wherein the step of selecting a maximum permissible amount for at least one driver-controllable vehicle performance characteristic comprises selecting a desired driving style from gentle, normal and sporty.

6. The method of claim 1, further comprising detecting weather conditions in proximity to the vehicle and wherein the step of calculating a still possible range is based partly on the weather conditions.

7. The method of claim 6, wherein the step of detecting weather conditions comprises selecting at least one of external temperature, precipitation and wind.

8. The method of claim 1, further comprising detecting a state of an energy accumulator in the motor vehicle and wherein the step of calculating a still possible range is based partly on the state of the energy accumulator.

9. The method of claim 1, further comprising detecting an operating state of at least one vehicle comfort system and wherein the step of calculating a still possible range is based partly on the detected operating state of the at least one vehicle comfort system.

10. The method of claim 9, wherein the step of detecting an operating state of at least one vehicle comfort system comprises detecting an operating state of at least one of a radio, an air-conditioning system, a heating system and a lighting system.

11. The method of claim 1, further comprising detecting at least one characteristic of a state of the motor vehicle that affects energy efficiency, and wherein the step of calculating a still possible range is based partly on the detected characteristic of the state of the motor vehicle that affects energy efficiency.

12. The method of claim 11, wherein the step of detecting at least one characteristic of a state of the motor vehicle that affects energy efficiency comprises detecting at least one of: a wear state of tires on the motor vehicle, aerodynamic characteristic values, temperature of an engine of the motor vehicle, temperature of a transmission of the motor vehicle, conformance with a maintenance schedule for the motor vehicle, a load carried by the motor vehicle and a presence or absence of roof extensions.

13. The method of claim 1, further comprising indicating visually, acoustically or haptically whether the maximum permissible amount of the vehicle performance characteristic selected by the driver has been reached.

14. The method of claim 1, wherein the step of displaying the calculated still possible range comprises detecting the still possible range on a navigation device of the vehicle.

15. A motor vehicle having a device for estimating range, comprising
    a detection device for detecting a quantity of energy carried in a motor vehicle;
    an input device operative to permit a driver to input at least one limitation on a driving performance;
    a navigation device that detects route profiles for a plurality of routes in proximity to the motor vehicle; and
    a computer device that calculates a still possible range on each of the plurality of routes at least on the basis of the limitation on driving performance that has been inputted by the driver, the detected road profiles and the quantity of energy carried in the motor vehicle.

16. The motor vehicle of claim 15, wherein the motor vehicle is an electric vehicle, a motor vehicle driven by internal combustion engine or a hybrid vehicle.

17. The motor vehicle of claim 15, wherein the navigation device is configured to display the still possible range on each of the plurality of routes calculated by the computer device.

18. The method of claim 1, wherein the step of displaying in the motor vehicle the calculated still possible range on each of the plurality of routes comprises simultaneously displaying on a GPS map the possible ranges on each of the plurality of routes to define an outer boundary of possible ranges.

19. The method of claim 1, further comprising inputting a destination into a GPS, and displaying the destination simultaneously with the step of displaying the calculated still possible range on each of the plurality of routes.

20. The method of claim 19, further comprising calculating a still possible range for each of a second plurality of routes from the destination, if the destination can be reached with the detected quantity of energy carried in the motor vehicle, and displaying in the motor vehicle the calculated still possible range on each of the second plurality of routes from the destination.

21. The method of claim 19, further comprising inputting a request for a fastest route to the destination and displaying in the motor vehicle one of the plurality of routes that will achieve the fastest time to the destination.

22. The method of claim 19, further comprising inputting a request for a most fuel efficient route to the destination and displaying in the motor vehicle one of the plurality of routes that will use a least amount of energy to reach the destination.

23. The method of claim 5, further comprising changing the selected driving style, recalculating the still possible range for each of the plurality of routes based on the changed selected driving style and presenting a new display in the motor vehicle of the recalculated still possible range on each of the plurality of routes.

\* \* \* \* \*